(12) United States Patent
Weber et al.

(10) Patent No.: US 10,802,739 B1
(45) Date of Patent: Oct. 13, 2020

(54) DATA STORAGE DEVICE CONFIGURATION FOR ACCESSING DATA IN PHYSICAL REALMS

(71) Applicant: Western Digital Technologies, Inc., San Jose, CA (US)

(72) Inventors: Ralph O. Weber, Dallas, TX (US); William B. Boyle, Lake Forest, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/410,750

(22) Filed: May 13, 2019

(51) Int. Cl.
   G11B 5/596 (2006.01)
   G06F 3/06 (2006.01)
   G11B 5/012 (2006.01)
   G06F 12/08 (2016.01)
   G11B 5/008 (2006.01)
   G11B 5/54 (2006.01)

(52) U.S. Cl.
   CPC .......... G06F 3/0638 (2013.01); G06F 3/0604 (2013.01); G06F 3/0676 (2013.01); G06F 12/08 (2013.01); G11B 5/00813 (2013.01); G11B 5/012 (2013.01); G11B 5/54 (2013.01); G11B 5/59633 (2013.01); G11B 5/59638 (2013.01)

(58) Field of Classification Search
   None
   See application file for complete search history.

(56) References Cited

U.S. PATENT DOCUMENTS

| | | | |
|---|---|---|---|
| 8,397,107 B1 * | 3/2013 | Syu | G06F 11/1012 711/154 |
| 8,699,159 B1 | 4/2014 | Malina | |
| 8,817,413 B1 | 8/2014 | Knigge et al. | |
| 9,153,247 B1 * | 10/2015 | Hall | G11B 20/10009 |
| 9,383,923 B1 | 7/2016 | Malina et al. | |
| 9,418,699 B1 * | 8/2016 | Gibbons | G11B 20/1217 |
| 9,864,529 B1 * | 1/2018 | Chen | G06F 3/0619 |
| 10,366,726 B1 * | 7/2019 | Granz | G11B 5/5578 |
| 10,381,040 B1 * | 8/2019 | Boyle | G11B 20/1217 |
| 10,424,334 B1 * | 9/2019 | Xiong | G11B 20/1258 |

(Continued)

OTHER PUBLICATIONS

Brewer et al.; "Disks for Data Centers, White paper for FAST 2016"; Feb. 23, 2016; 16 pages; Version 1.1; available at https://ai.google/research/pubs/pub44830.

(Continued)

Primary Examiner — Tan X Dinh
(74) Attorney, Agent, or Firm — Barry IP Law, P.C.

(57) ABSTRACT

A data storage device includes a disk and a plurality of actuators for reading and writing data on the disk in different physical realms. Each physical realm is associated with at least one logical zone domain including at least one logical zone. The at least one logical zone domain corresponds to an actuator of a plurality of actuators that accesses the physical realms associated with the at least one logical zone domain. In one aspect, reading and writing of data is enabled in one or more logical zones in response to a SATA zone activate command. In another aspect, a SATA read or write command is received indicating at least one logical address for data to read or written on the disk. Data is read or written in a physical realm using the actuator corresponding to a logical zone domain including the at least one logical address.

20 Claims, 8 Drawing Sheets

(56) References Cited

U.S. PATENT DOCUMENTS

| | | | |
|---|---|---|---|
| 2013/0027802 A1* | 1/2013 | Kim | G06F 3/064 |
| | | | 360/49 |
| 2013/0031317 A1* | 1/2013 | Ryu | G06F 3/0611 |
| | | | 711/154 |
| 2014/0019680 A1 | 1/2014 | Jin et al. | |
| 2014/0055881 A1 | 2/2014 | Zaharris | |
| 2014/0201424 A1 | 7/2014 | Chen et al. | |
| 2014/0340786 A1 | 11/2014 | Xu et al. | |
| 2015/0109700 A1* | 4/2015 | Kashiwase | G11B 5/09 |
| | | | 360/77.04 |
| 2015/0237138 A1 | 8/2015 | Malina et al. | |
| 2015/0339319 A1 | 11/2015 | Malina | |
| 2016/0299698 A1* | 10/2016 | Hall | G06F 3/064 |
| 2018/0260332 A1* | 9/2018 | Dunn | G06F 3/0659 |
| 2018/0342261 A1 | 11/2018 | Das | |
| 2019/0013046 A1 | 1/2019 | Kulkarni et al. | |
| 2020/0104252 A1* | 4/2020 | Subbarao | G06F 12/08 |

OTHER PUBLICATIONS

Pending U.S. Appl. No. 16/024,211, filed Jun. 29, 2018, entitled "Dynamic Hybrid Shingled Magnetic Recording Device", William B. Boyle.

Pending U.S. Appl. No. 16/231,748, filed Dec. 24, 2018, entitled "Dynamic Performance Density Tuning for Data Storage Device", James N. Malina.

Theodore Ts'O; "Hybrid-SMR Product Requirements Proposal for OCP"; Nov. 13, 2017, 3 pages; available at https://www.opencompute.org/wiki/Storage.

Timothy Feldman; "Flex"; Seagate; Dec. 11, 2017; 17 pages; available at https://www.opencompute.org/wiki/Storage.

T13/BSR INCITS 549, Draft Proposed American National Standard, Information Technology—Zoned Device ATA Command Set-2 (ZAC-2), Rev. 1b, Feb. 18, 2019, 164 pages.

* cited by examiner

DATA STORAGE DEVICE CONFIGURATION FOR ACCESSING DATA IN PHYSICAL REALMS

BACKGROUND

Data Storage Devices (DSDs) are often used to record data onto or to reproduce data from a storage media. One type of storage media includes a rotating magnetic disk, such as in a Hard Disk Drive (HDD). In such DSDs, a head is positioned using an actuator to magnetically read and write data in tracks on a surface of the disk. The recent use of larger capacity HDDs has highlighted detectably lower rates of Input/Output (I/O) operations per storage capacity unit (e.g., I/O operations per gigabyte). This has led to interest in HDDs using multiple actuators to simultaneously access data in different radial locations on the same disk or in the same disk pack. In addition to the ability to simultaneously access data at different radial locations, multiple actuators can improve performance in terms of a rate of I/O operations by reducing the seek time to reach particular tracks on a disk surface, since less distance needs to be covered by each actuator.

Different standards have been developed for interfacing between a host and a DSD so that the host can store and retrieve data from the DSD. Such standards include Small Computer System Interface (SCSI) and Serial Advanced Technology Attachment (SATA). While SCSI can use a separate logical unit (e.g., Logical Unit Number (LUN)) for each actuator in an HDD including multiple actuators, similar logical units are not part of SATA. This lack of logical units in SATA has prevented the use of SATA as an interface for DSDs including multiple actuators. In addition to HDDs with multiple actuators, the lack of logical units in SATA has also prevented the use of SATA for other types of DSDs that rely on logical units to represent different devices.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Systems

Figure 1:
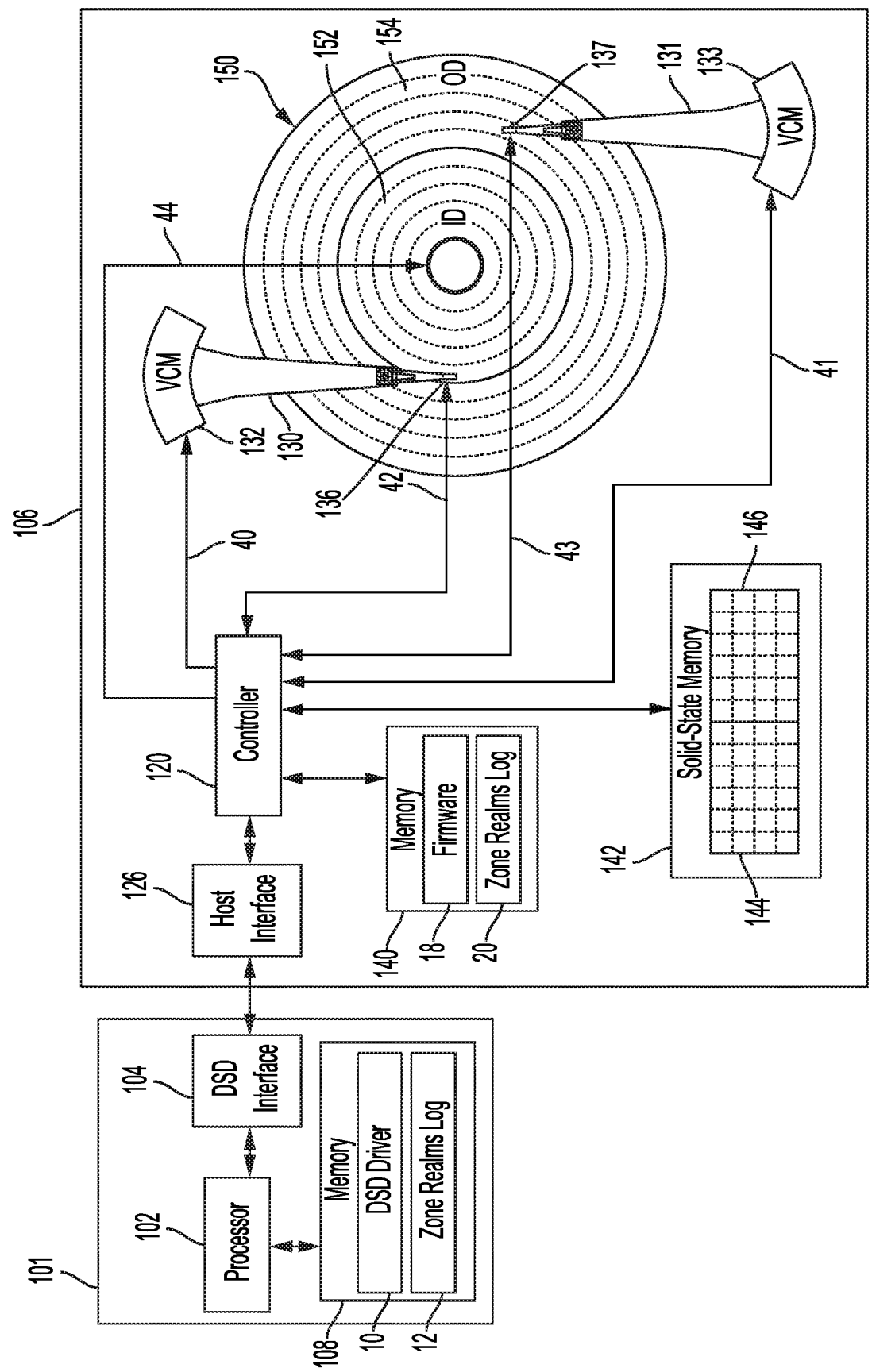
FIG. 1 is a block diagram of a Data Storage Device (DSD) and a host according to an embodiment.

FIG. 1 shows an example of Data Storage Device (DSD) 106 which communicates with host 101 according to an embodiment. Host 101 communicates with DSD 106 to retrieve data from and store data in DSD 106. In some implementations, host 101 is separate from DSD 106, and may include, for example, a server or other computer system. In other implementations, host 101 may be housed together with DSD 106 as part of a single electronic device, such as, for example, a desktop, laptop or notebook computer or another type of electronic device such as a tablet, smartphone, network media player, portable media player, or Digital Video Recorder (DVR). As used herein, a host can refer to a device that is capable of issuing commands to a DSD to store data or retrieve data. In this regard, host 101 may include another storage device such as a smart DSD that is capable of executing applications and communicating with other DSDs.

Host 101 includes processor 102, which can include circuitry for executing instructions, such as those of DSD driver 10. In some implementations, processor 102 can include circuitry such as, for example, one or more processor cores, a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, controller 120 can include a System on a Chip (SoC).

As shown in FIG. 1, processor 102 of host 101 communicates with memory 108, which can include, for example, a volatile Random-Access Memory (RAM) such as Dynamic RAM (DRAM), or a non-volatile RAM or other solid-state memory. Data stored in memory 108 can include, for example, instructions loaded from DSD driver 10 for execution by processor 102, zone realms log 12 or a portion thereof, and/or data used in executing applications such as DSD driver 10 or an Operating System (OS) of host 101.

As discussed in more detail below, zone realms log 12 can include, for example, one or more data structures associating physical realms in DSD 106 with one or more respective logical zone domains corresponding to different data access methodologies for accessing the physical realms associated with the one or more respective logical zone domains. In this regard, zone realms log 12 can provide a mapping between logical addresses (e.g., Logical Block Addresses (LBAs)) of the logical zone domains and/or logical zones within the logical zone domains, and physical realms of the storage media of DSD 106. The physical realms in zone realms log 12 can be indicated by a physical realm number. In other implementations, the physical realms may be identified by physical addresses (e.g., Physical Block Addresses (PBAs)) identifying physical locations in the storage media.

In FIG. 1, DSD interface 104 is configured to interface host 101 with DSD 106, and interfaces according to a Serial Advanced Technology Attachment (SATA) standard. Similarly, host interface 126 of DSD 106 is configured to interface DSD 106 with host 101 using the SATA standard. As will be appreciated by those of ordinary skill in the art, host interface 126 can be included as part of controller 120 of DSD 106.

As shown in FIG. 1, DSD 106 includes controller 120 which includes circuitry such as one or more processors for executing instructions and can include, for example, a microcontroller, a DSP, an ASIC, an FPGA, hard-wired logic, analog circuitry and/or a combination thereof. In some implementations, controller 120 can include an SoC. Controller 120 can access memory 140 to execute instructions, such as those from firmware 18 used to control operation of DSD 106.

In the example of FIG. 1, DSD 106 includes memory 140, which can include, for example, a volatile RAM such as DRAM, or a non-volatile RAM or other solid-state memory. Memory 140 can be used by DSD 106 to store data used by controller 120. Data stored in memory 140 can include data read from disk 150 or solid-state memory 142, data to be stored in disk 150 or solid-state memory 142, instructions loaded from firmware 18 for execution by controller 120, and/or data used in executing firmware 18. Such data may include zones realms log 20, or a portion of a zone realms log that has been loaded into memory 140 from a Non-Volatile Memory (NVM), such as from disk 150 or solid-state memory 142.

As with zone realms log 12 stored in host 101, zone realms log 20 stored in DSD 106 can include, for example, one or more data structures associating physical realms in DSD 106 with logical zone domains corresponding to different data access methodologies for accessing the physical realms associated with the one or more respective logical zone domains. In some implementations, zone realms log may form part of a logical to physical mapping table or other address indirection table. In this regard, zone realms log 20 can provide a mapping between logical addresses (e.g., LBAs) of the logical zone domains and/or logical zones within the logical zone domains, and physical realms of the storage media of DSD 106. The physical realms in zone realms log 12 can be indicated by a physical realm number and/or by physical addresses (e.g., PBAs) identifying physical locations in the storage media.

In the example of FIG. 1, DSD 106 is a Solid-State Hybrid Drive (SSHD) in that it includes both a solid-state non-volatile memory (i.e., solid-state memory 142 in FIG. 1) and a rotating magnetic disk (i.e., disk 150 in FIG. 1) for non-volatilely storing data. In other implementations, DSD 106 may only include one of disk 150 or solid-state memory 142 so as to make DSD 106 a Hard Disk Drive (HDD) or a Solid-State Drive (SSD), respectively.

In the example of FIG. 1, disk 150 is rotated by a spindle motor (not shown) and head 136 is positioned to read and write data on the surface of disk 150. In more detail, head 136 is connected to the distal end of actuator 130 which is rotated by Voice Coil Motor (VCM) 132 to position head 136 over disk 150 to read or write data in tracks. A servo system (not shown) of controller 120 controls the rotation of disk 150 with SM control signal 44 and controls the position of head 136 using VCM control signal 40.

To increase the rate of Input/Output (I/O) operations that can be performed on disk 150, DSD 106 includes a second actuator (i.e., actuator 131) for simultaneously accessing portions of disk 150 in different radial locations than those being accessed by head 136 on actuator 130 and for reducing the seek time to reach particular tracks for accessing data. In more detail, head 137 is connected to the distal end of actuator 131 which is rotated by VCM 133 to position head 137 over disk 150 to read or write data in tracks. The servo system of controller 120 controls the position of head 137 using VCM control signal 41.

As will be appreciated by those of ordinary skill in the art, disk 150 may form part of a disk pack including multiple disks that are radially aligned with disk 150. In such implementations, heads 136 and 137 may each form part of different Head Stack Assemblies (HSAs) including heads arranged to read data from and write data to a corresponding disk surface in the disk pack.

In operation, host interface 126 receives SATA read and write commands from host 101 via host interface 126 for reading data from and writing data to disk 150 or solid-state memory 142 of DSD 106. In response to a write command from host 101, controller 120 may determine a location for writing data for the command and buffer the data to be written for the write command in memory 140.

For data to be written on disk 150, a read/write channel (not shown) of controller 120 may encode the buffered data into write signal 42 or write signal 43 that is provided to head 136 or head 137, respectively, for magnetically writing data on disk 150. A servo system of controller 120 can provide VCM control signal 40 or VCM control signal 41 to VCM 132 or VCM 133 to position head 136 or head 137, respectively, over a particular track for writing the data.

To read data from disk 150, the servo system positions head 136 or head 137 over a particular track, and controller 120 controls the head to magnetically read data stored in the track and send the read data as read signal 42 or read signal 43. A read/write channel of controller 120 can then decode and buffer the data into memory 140 for transmission to host 101 via host interface 126.

As shown in FIG. 1, disk 150 includes physical realm 152 in an Inner Diameter (ID) portion of the disk surface and physical realm 154 in an Outer Diameter (OD) portion of the disk surface. The physical realms on disk 150 are concentrically laid out on disk 150 and include tracks for storing data. As described in more detail below, physical realm 152 is associated with at least one logical zone domain that corresponds to actuator 130, and physical realm 154 is associated with at least one logical zone domain that corresponds to actuator 131. In this regard, actuator 130 is used to access data in physical realm 152 and actuator 131 is used to access data in physical realm 154.

In some implementations, a physical realm can include portions from multiple disk surfaces such as opposing surfaces of disk 150 or portions of disks in a disk pack. Similarly, a logical zone domain may be associated with physical realms or portions of different disk surfaces that are accessed by the same actuator. For example, a first logical zone domain may be associated with all of the ID physical realms on different disk surfaces of a disk pack including disk 150 that are accessed by actuator 130. In such an example, a second logical zone domain may be associated with all of the OD physical realms on different disk surfaces of the disk pack that are accessed by actuator 131.

In some implementations, and as described in more detail below with reference to FIGS. 2A to 3, a physical realm can be associated with multiple logical zone domains. For example, physical realm 152 in FIG. 1 can be associated with a first logical zone domain for data to be written with non-overlapping tracks (i.e., Conventional Magnetic Recording (CMR)) using actuator 130, and physical realm 152 can also be associated with a second logical zone domain for data to be written with overlapping tracks (i.e., Shingled Magnetic Recording (SMR)) using actuator 130. Similarly, physical realm 154 can be associated with a third logical zone domain for data to be written with non-overlapping tracks (i.e., CMR) using actuator 131, and physical realm 154 can also be associated with a fourth logical zone domain for data to be written with overlapping tracks (i.e., SMR) using actuator 131.

SMR can allow for a greater storage capacity on disk 150 by increasing the number of Tracks Per Inch (TPI) on disk 150 with narrower overlapping tracks than the non-overlapping tracks used in CMR. However, the overlapping of tracks with SMR means that previously written data cannot be changed or rewritten without affecting an adjacent track. SMR zones are therefore sequentially written in one radial direction to avoid affecting previously written data in the zone.

The sequential writing in an SMR storage area can decrease the number of random (i.e., non-sequential) read and write commands that can be performed on disk 150, as compared to the number of random read and write commands that can be performed in a CMR storage area in a given period of time. In more detail, SMR typically uses address indirection to prevent having to rewrite data that is modified by leaving the old or obsolete version of the data in the same location on disk 150, writing the modified version of the data in a new location on disk 150, and updating a logical to physical mapping for the modified data from the old physical address to the new physical address. This can add overhead in performing commands in an SMR zone and result in more fragmentation of the data, which can cause more seek time to access different portions of modified data in SMR zones. Accordingly, a host may use logical zone domains (e.g., via DSD driver 10) in the field or on the fly to write data using SMR or CMR to obtain different advantages or to obtain different target thresholds, such as a greater storage capacity with SMR or a higher rate of random I/O operations with CMR.

In other implementations, the different logical zone domains may differ with respect to different data access methodologies other than whether tracks are written using CMR or SMR and/or whether tracks are accessed using a particular actuator. For example, a first logical zone domain and a second logical zone domain may correspond to different levels of energy-assisted recording, such as, for example, varying stages or amounts of Thermal Fly-Height Control (TFC), Heat Assisted Magnetic Recording (HAMR) or Microwave Assisted Magnetic Recording (MAMR).

In the example of TFC, head 136 and/or head 137 can include a fly-height heater that heats a portion of the head to decrease the distance between the head and the surface of disk 150. As the areal density of disks increase, a fly-height of the head or the distance between the head and disk surface typically decreases to be able to read and write data in smaller or narrower tracks on the disk. For example, many modern HDDs may have a fly-height of only several nanometers. At such relatively small distances, control of the fly-height becomes more important for avoiding errors when writing and reading data due to variations in the fly-height. In many cases, the fly-height can change when a write current used to write data on the disk causes part of a slider including the head to heat up and expand or protrude toward the disk, while reading data may not cause a similar type of heating and expansion toward the disk.

In order to provide a more consistent fly-height when reading and writing data, some recent DSDs include a fly-height heater on the slider that causes a bottom surface of the slider to expand or protrude closer to the disk surface when the heater is on, and cause the bottom surface of the slider to retract away from the disk when the heater is off. The turning on of the fly-height heater may then be controlled with the writing and reading of data on the disk to provide a more consistent fly-height. For example, before writing data, the fly-height heater may be turned on at a high-power to preheat the head and then the power may be reduced as writing begins so that the fly-height of the head remains relatively the same with the heating provided by the write current during the write process. Before reading data, the fly-height heater may be turned on to a high power to preheat the head before reading and then left at the high power to maintain relatively the same fly-height throughout the read process.

A first logical zone domain may include logical zones or portions where data is written in wider tracks than in other logical zones or portions of a second logical zone domain where data is written in narrower tracks. The first logical zone domain may therefore use a lower energy level to read and write data than in the second logical zone domain, since the head does not need to be as close to the surface of disk 150. In other implementations, different logical zone domains may use tracks of similar width, but use different energy levels to provide a higher accuracy for reading and/or writing data in one logical zone domain as compared to another logical zone domain. In both examples, the use of a different energy level can add to the amount of time needed to perform commands on average due to additional maintenance operations that may be needed for the different energy level. For example, writing closer to the disk surface for a second logical zone domain using a higher energy level may require additional refreshing or rewriting of data in the second logical zone domain due to a greater amount of Adjacent Track Interference (ATI).

A lower fly-height (i.e., closer to the disk surface) may also cause a faster deterioration of the head due to the increased heat and accumulated particles on the head, such as from disk lubricant. Accordingly, a host may use logical zone domains (e.g., via DSD driver 10) to set different energy levels in the field or on the fly to trade off storage capacity or accuracy with a usable life expectancy for a head or a desired average rate of I/O operations. The host can make such selections based on actual workloads in the field.

In the example of HAMR, a laser diode on head 136 and/or head 137 may heat a small region of disk 150 that is to be written by the head. The heating of disk 150 temporarily lowers the coercivity of grains in disk 150 to allow the grains to become magnetized by the head, before returning to a higher coercivity after cooling off. This allows the use of smaller grains (and thus a higher storage density) that require a higher coercivity to remain magnetized after being written due their smaller size. A first logical zone domain may correspond to using HAMR, while a second logical zone domain may correspond to not using HAMR. In this regard, the first logical zone domain may allow for a greater storage capacity, while the second logical zone domain may allow for a longer life of a head due to less heat at the head and may also allow commands to be performed quicker on average due to less maintenance or background operations needed for the second logical zone domain. A host may use the different logical zone domains (e.g., via DSD driver 10) to set different physical realms for writing with or without HAMR.

In the example of MAMR, head 136 can include a Spin Torque Oscillator (STO) to generate a microwave field that allows the disk to be more easily magnetized with a lower magnetic field so that a higher storage density can be achieved. However, as with TFC and HAMR, the use of this energy-assisted recording for MAMR is associated with an overall increased time to perform commands due to additional operations needed to be performed. In one implementation, a second logical zone domain can use MAMR, while a first logical zone domain does not use MAMR.

As another example of how a first logical zone domain and a second logical zone domain may differ in terms of data access methodologies, the first logical zone domain and the second logical zone domain may use different sector sizes. For example, the first logical zone domain may include smaller sectors of 512 bytes, while the second logical zone domain may include larger sectors of 4,096 bytes (i.e., a 4K sector). Although the larger sector size of the second area type provides for a greater storage capacity in a given area on the disk and can provide for stronger error correction, the performance of commands in the second logical zone domain on average take longer than performing commands in the first logical zone domain using the smaller sector size. In one aspect, an entire 4K sector in the second logical zone domain needs to be read and/or written to perform read and write commands, as opposed to reading or writing a smaller or more granular 512 byte sector in the first logical zone domain. There is also processing involved in extracting portions of a larger 4K sector when performing read commands or rewriting a full 4K sector to modify a portion of the sector to accommodate a non-native 4K or 512 byte OS at host 101. Accordingly, a host (e.g., via DSD driver 10) may set different logical zone domains corresponding to different sector sizes based on capacity, error correction, or processing needs. In addition, different hosts may set different logical zone domains at the same DSD to enable different sector sizes.

In another example of different data access methodologies used for different logical zone domains, disk 150 may use different amounts of error correction for different logical zone domains. For example, sectors in a first logical zone domain may include less data for Error Correcting Code (ECC) than sectors in a second logical zone domain for checking or correcting the data read in the sector. This can ordinarily allow for commands to performed quicker in the first logical zone domain than in the second logical zone domain, but the error correction in the second logical zone domain is stronger than in the first logical zone domain.

In yet another example of data access methodologies corresponding to different logical zone domains, different data densities in a radial direction across tracks and/or in a circumferential direction along tracks can be used for different logical zone domains. For example, a first logical zone domain may include a lower TPI with wider tracks and/or more space between the tracks, or a lower Bits Per Inch (BPI) along the tracks written for the first logical zone domain. A second logical zone domain with a greater areal data density in terms of TPI and/or BPI may require a greater amount of maintenance operations that can add to the overall amount of time needed to perform commands in the second logical zone domain as compared to the first logical zone domain. For example, a greater areal data density in the second logical zone domain may require additional refreshing or rewriting of data in the second logical zone domain due to a greater amount of ATI.

As discussed in more detail below, DSD 106 may include more than two logical zone domains corresponding to more than two different data access methodologies for reading and writing data. In addition, logical zone domains may differ in more than one data access methodology, such as where a first logical zone domain is written using a first actuator, CMR, and less error correction, while a second logical zone domain is written using a second actuator, SMR, and more error correction. The logical zone domains may also differ in terms of storage media such as where a first logical zone domain is associated with physical realms in solid-state memory 142 (e.g., physical realms 144 and 146 in FIG. 1) and a second logical zone domain is associated with physical realms on disk 150 (e.g., physical realms 152 and 154 in FIG. 1).

As shown in the example of FIG. 1, solid-state memory 142 includes different physical realms that each include blocks for storing data. In some implementations, the different physical realms may correspond to a die or block. In the example of FIG. 1, solid-state memory 142 includes physical realm 144 and physical realm 146. As noted above, physical realms 144 and 146 of solid-state memory 142 may be associated with a first logical zone domain corresponding to a first data access methodology, while physical realms 152 and 154 of disk 150 may be associated with a second logical zone domain corresponding to a second data access methodology.

In other implementations, physical realm 144 can be associated with a first logical zone domain for data to be written using Single Level Cells (SLCs) corresponding to a first data access methodology, and physical realm 146 can be associated with a second logical zone domain for data to be written using Multi-Level Cells (MLCs) corresponding to a second data access methodology. As will be appreciated by those of ordinary skill in the art, MLCs may store more data in a given physical space by using multiple levels, but data in SLCs may be read and written quicker than MLCs. As with physical realms of disk 150, physical realms of solid-state memory 142, such as physical realms 144 and 146, can be associated with logical zone domains that differ in more than one aspect, such as where a first logical zone domain uses SLC and less error correction, while a second logical zone domain uses MLC and more error correction. Host 101 may then use different logical zone domains to control how solid-state memory 142 is written based on actual workloads in the field and/or thresholds.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., Single-Level Cell (SLC) memory, Multi-Level Cell (MLC) memory (i.e., two or more levels), or any combination thereof), NOR memory, EEPROM, Ferroelectric Memory (FeRAM), Magnetoresistive RAM (MRAM), other discrete NVM chips, or any combination thereof.

Those of ordinary skill in the art will appreciate that other embodiments can include more or less than the elements shown in FIG. 1, and that the disclosed processes can be implemented in other environments. For example, other embodiments can include a different number of hosts, DSDs, disks, solid-state memories, actuators, physical realms, or zone realms logs.

Figure 2A:
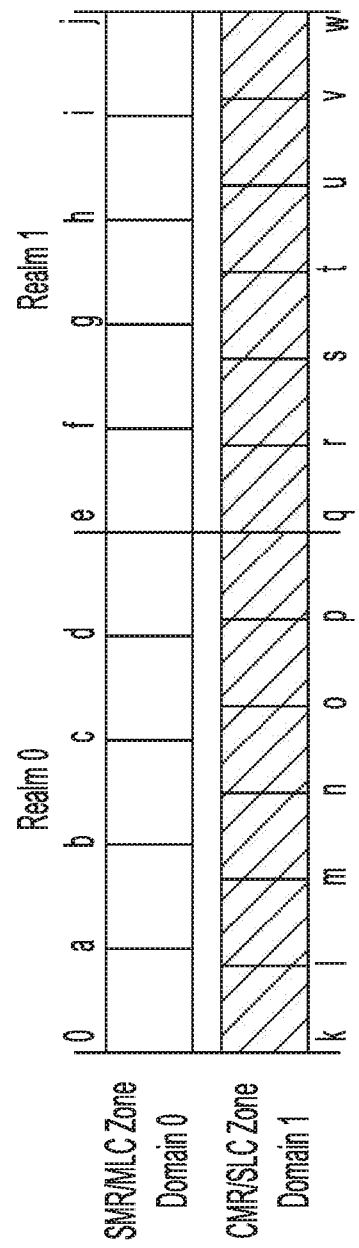
FIG. 2A illustrates an example of the association of physical realms with logical zone domains according to an embodiment.

FIG. 2A illustrates an example of the association of physical realms with logical zone domains according to an embodiment. As shown in the example of FIG. 2A, physical realms 0 and 1 are associated with logical zone domain 0 and with logical zone domain 1. In one implementation, logical zone domain 0 corresponds to a first data access methodology of SMR, and logical zone domain 1 corresponds to a second data access methodology of CMR. In a different implementation of FIG. 2A, logical zone domain 0 corresponds to a first data access methodology of MLC, and logical zone domain 1 corresponds to a second data access methodology of SLC.

As shown in FIG. 2A, logical zone domain 0 includes logical zones comprising contiguous logical addresses (e.g., LBAs) from 0 to j. Logical zone domain 1 includes logical zones comprising contiguous logical addresses from k to w. Since the amount of data written in a given physical area (e.g., a track on disk 150 or a block in solid-state memory 142 in FIG. 1) differs depending on whether the first data access methodology (e.g., SMR or MLC) or the second data access methodology (e.g., CMR or SLC) is used, the number of logical zones per physical realm differs depending on whether logical zone domain 0 is used or logical zone domain 1 is used. For example, five logical zones are shown in FIG. 2A ending at logical addresses a, b, c, d, and e-1 when logical zone domain 0 is used in realm 0, as compared to six logical zones ending at logical addresses l, m, n, o, p, and q-1 when logical zone domain 1 is used in realm 1.

In the example of FIG. 2A, all of the logical zones in logical zone domain 0 are active or enabled, and all of the logical zones in logical zone domain 1 are inactive or disabled, as shown by the cross-hatching of the logical zones in logical zone domain 1. As discussed in more detail below with reference to the zone activate processes of FIGS. 5 and 7, a SATA zone activate command can be received, such as from host 101 in FIG. 1 during a factory configuration process or in the field, to activate one or more logical zones in a logical zone domain for enabling reading and writing of data in the activated one or more logical zones. In this regard, logical zones from logical address 0 to logical address j of logical zone domain 0 can be accessed for reading or writing data using the data access methodology or methodologies corresponding to logical zone domain 0 (e.g., SMR or MLC in FIG. 2A). On the other hand, logical zones from logical address k to logical address w of logical zone domain 1 cannot be accessed for reading or writing data.

Figure 2B:
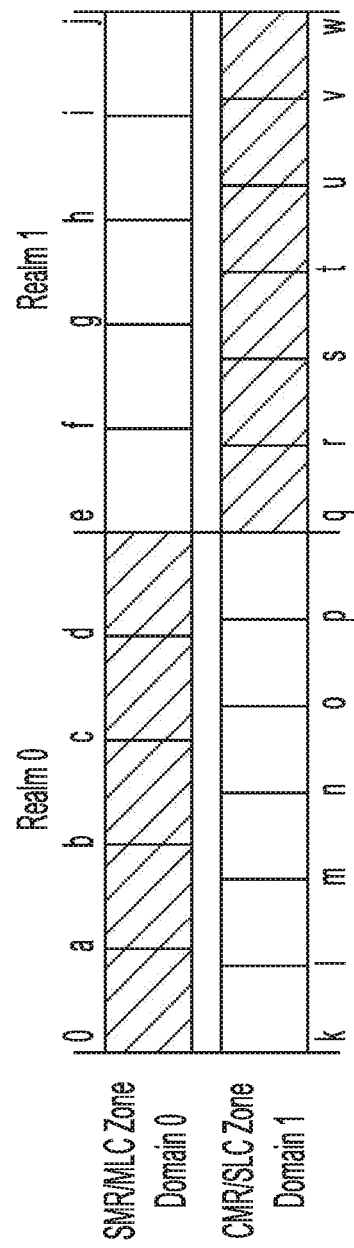
FIG. 2B illustrates the activation of logical zones of FIG. 2A according to an embodiment.

FIG. 2B illustrates the activation of logical zones in logical zone domain 1 that are associated with physical realm 0 of FIG. 2A according to an embodiment. As shown in FIG. 2B, logical zones from logical address k to logical address q-1 of logical zone domain 1 have been activated or enabled for physical realm 0. As a result, the data access methodology or methodologies corresponding to logical zone domain 0 (e.g., CMR or SLC in FIG. 2A) are then used when accessing data in physical realm 0.

In addition, logical zones from logical address 0 to logical address e-1 have been deactivated or disabled for physical realm 0, since at least a portion of physical realm 0 is associated with logical zones in both logical zone domains 0 and 1. Generally, the activation of one or more logical zones results in the deactivation of one or more other logical zones when a physical realm is associated multiple logical zone domains. In the example of FIG. 2B, the data access methodology corresponding to logical zone domain 0 (i.e., SMR or MLC) cannot be used when accessing data in physical realm 1 after the deactivation of logical zones from logical address 0 to logical address e-1. In some implementations, read and write commands for the deactivated logical zones will result in an error returned to the host without reading or writing data for the command.

In some implementations, it may first be determined whether one or more logical zones to be activated are available to be activated based at least in part on whether data is already stored for a different logical zone in a different logical zone domain in at least a portion of a physical realm associated with the one or more logical zones to be activated. The determination may be made using, for example, zone realms log 12 and/or zone realms log 20 in FIG. 1. As discussed below with respect to the processes of FIGS. 5, 7, and 8, such a determination of whether one or more logical zones are available for activation can be part of a zone activation process or part of a zone query process.

In cases where data has already been written for one logical zone domain that overlaps in at least a portion of a physical realm associated with one or more logical zones to be activated for a different logical zone domain, the previously written data using the data access methodology or methodologies corresponding to the first logical zone domain may be relocated or rewritten in a different physical realm that is associated with the first logical zone domain. For example, where data has already been written in a logical zone associated with logical zone domain 0 in a portion of physical realm 0, such data may be relocated to physical realm 1 to allow for the activation of logical zones from logical address k to logical address q-1 in logical zone domain 1.

Figure 3:
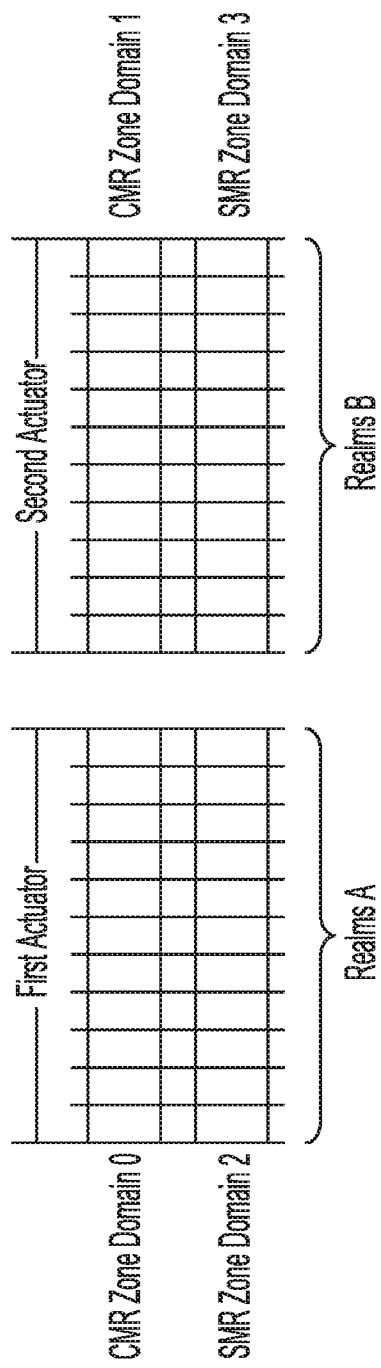
FIG. 3 illustrates an example of the association of physical realms with logical zone domains corresponding to different actuators that are used to access the physical realms according to an embodiment.

FIG. 3 illustrates an example of the association of physical realms with logical zone domains corresponding to different actuators that are used to access the physical realms according to an embodiment. As shown in the example of FIG. 3, a first actuator (e.g., actuator 130 in FIG. 1) is used to access physical realms A on one or more disk surfaces, and a second actuator (e.g., actuator 131 in FIG. 1) is used to access physical realms B on one or more disk surfaces. Each set of physical realms A and physical realms B is associated with two logical zone domains. Specifically, physical realms A served by the first actuator are associated with logical zone domain 0 and with logical zone domain 2. Physical realms B served by the second actuator are associated with logical zone domain 1 and with logical zone domain 3.

In the example of FIG. 3, logical zone domains 0 and 2 correspond to a different combination of data access methodologies than logical zone domains 1 and 3. In a first aspect, physical realms A associated with logical zone domains 0 and 2 are accessed using a different actuator than physical realms B associated with logical zone domains 1 and 3. In addition, logical zone domains 0 and 1 are written using CMR or non-overlapping tracks, while data written for logical zone domains 2 and 3 are written using SMR or overlapping tracks.

The association of physical realms with logical zone domains corresponding to different actuators can allow a SATA interface to be used for DSDs including multiple actuators, even though SATA does not include logical units as in a SCSI interface (e.g., SCSI's Logical Unit Numbers (LUNs)). Additional logical zone domains can be used or layered in such multi-actuator DSDs to correspond to additional data access methodologies or sub-methodologies, such as one or more of SMR or CMR, different energy levels for energy-assisted recording (e.g., as in TFC, HAMR, MAMR), different data densities, different levels of error correction, and different sector sizes. As with the example of FIG. 1, some logical zone domains can correspond to a data access methodology or methodologies for a different type of storage media (e.g., logical zone domains associated with physical realms 144 and 146 in solid-state memory 142 in FIG. 1).

As discussed above with reference to FIG. 2B, logical zones in one logical zone domain may be activated while one or more overlapping logical zones in one or more different logical zone domains are deactivated. In such cases, the logical zones from the different logical zone domains are overlapping in terms of being associated with the same physical realm or realms. Only the logical addresses in the activated logical zones can be accessed for reading and writing data. The logical addresses in the deactivated logical zone or zones cannot be accessed for reading or writing data.

With reference to the example of FIG. 3, logical zone domain 0 or certain logical zones within logical zone domain 0 may be activated for writing and reading data in CMR tracks. The logical zones within logical zone domain 2 that overlap or that are associated with the same physical realms as the activated logical zones are deactivated to prevent writing and reading data in SMR tracks in the same physical area. In some implementations, an entire logical zone domain (e.g., logical zone domain 0) may be activated or enabled, while an entire logical zone domain that is associated with the same physical realms is deactivated or disabled.

In the example above, logical zone domain 0 may be activated for reading and writing data in physical realms A using the first actuator and CMR, while logical zone domain 3 may be activated for reading and writing data in physical realms B using the second actuator and SMR. As will be appreciated by those of ordinary skill in the art, other configurations or arrangements of physical realms and logical zone domains are possible. In this regard, host 101 may use a zone realms log (e.g., zone realms log 12) and a DSD driver (e.g., DSD driver 10) to activate particular logical zones or logical zone domains to achieve particular goals such as storage capacity, I/O performance (e.g., Input/Output Operations Per Second (IOPS)), or reliability.

Figure 4:
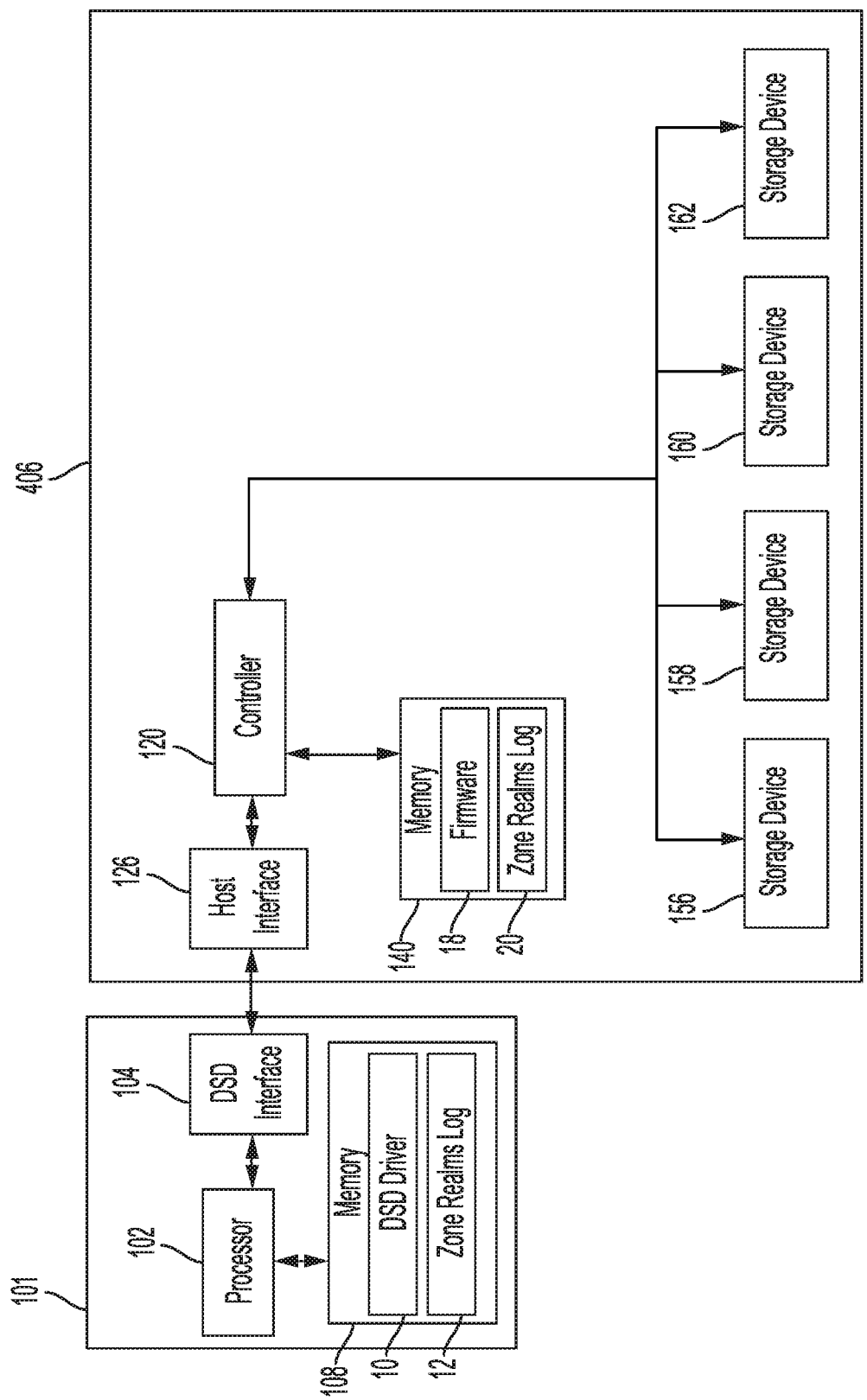
FIG. 4 is a block diagram of a DSD including an array of storage devices according to an embodiment.

FIG. 4 is a block diagram of DSD 406 including an array of storage devices 456, 458, 460, and 462 according to an embodiment. The system shown in FIG. 1 is similar to the system shown in FIG. 4, with the exception that DSD 406 in FIG. 4 includes storage devices 456 to 462 for non-volatilely storing data, instead of solid-state memory 142 and disk 150 in FIG. 1. The descriptions of host 101, processor 102, DSD interface 104, memory 108, DSD driver 10, zone realms log 12, host interface 126, controller 120, memory 140, firmware 18, and zone realms log 20 in FIG. 4 correspond to the descriptions provided above for FIG. 1. Accordingly, the description of these components, modules and data structures is not repeated here.

Storage devices 456 to 462 each include a non-volatile storage media, such as a rotating magnetic disk or solid-state memory for non-volatilely storing data. In this regard, each of storage devices 456 to 462 can include, for example, an HDD, SSD, or SSHD. In some implementations, the type of storage devices may vary, such as with storage devices 456 to 460 being HDDs and storage device 462 being an SSD. In addition, storage devices 456 to 462 may be configured as a Redundant Array of Independent Disks (RAID), with controller 120 serving as a RAID controller for storing data in stripes across storage devices 456 to 462.

In the example of FIG. 4, each of storage devices 456 to 462 include one or more physical realms for storing data. In some implementations, the physical realm or realms of each storage device are associated with different logical zone domains so that the access of data from each storage device corresponds to a different data access methodology. In addition, the physical realm or realms of each storage device can be associated with multiple overlapping logical zone domains corresponding to different data access methodologies (i.e., combinations of data access methodologies or sub-methodologies) such as, different methods of magnetic recording (e.g., CMR, SMR, TFC, MAMR, HAMR, different sector sizes, different TPI, different BPI), different levels of error correction, access by different actuators, or different types of solid-state memory storage (e.g., SLC, MLC).

The foregoing association of physical realms in different storage devices in an array of storage devices can allow for a SATA interface with host 101, which would otherwise need to use a different interface including logical units, such as SCSI.

Example Processes

Figure 5:
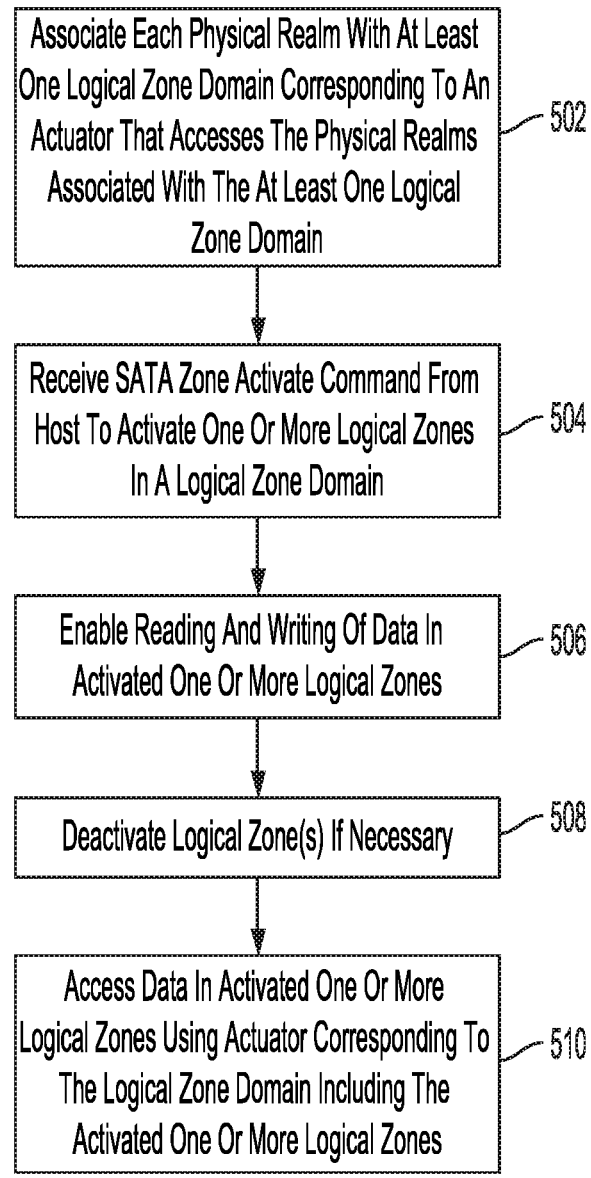
FIG. 5 is a flowchart for a zone activate process for a DSD including a plurality of actuators according to an embodiment.

FIG. 5 is a flowchart for a zone activate process for a DSD including a plurality of actuators according to an embodiment. The process of FIG. 5 can be performed, for example, by controller 120 of DSD 106 in FIG. 1 executing firmware 18. As discussed above with reference to FIGS. 2A, 2B, and 3, certain logical zones in different logical zone domains may be activated to enable the reading and writing of data in the logical zones. The zone activate process of FIG. 5 uses a SATA zone activate command to activate one or more logical zones for a DSD that includes a plurality of actuators for reading and writing data on a disk in different physical realms. Blocks 502 to 508 discussed below may be performed at the factory as part of a configuration process of the DSD and/or may be performed in the field to dynamically configure the DSD based on actual workloads.

In block 502, the controller associates each physical realm of a plurality of physical realms with at least one logical zone domain corresponding to an actuator of the plurality of actuators that accesses the physical realm or realms associated with the at least one logical zone domain. In some implementations, block 502 may be performed as part of an initial start-up or initialization process of the DSD either in the field or at the factory. Each logical zone domain can correspond to a different actuator, or multiple overlapping logical zone domains may correspond to the same actuator with different data access sub-methodologies. For example, logical zone domains 0 and 2 in FIG. 3 are both associated with physical realms A served by the first actuator, but correspond to different data access sub-methodologies for CMR and SMR, respectively. As noted above, different data access sub-methodologies may also be used, such as different energy levels for energy-assisted recording (e.g., TFC, HAMR, MAMR), different levels of error correction, different sector sizes, different BPI, and/or TPI.

In some implementations, the controller may also send an indication to one or more hosts of the association of the physical realms with the various logical zone domains and information about the logical addresses (e.g., LBAs) for the different logical zones in the logical zone domains. Such information may be used by the host in a zone realms log, such as zone realms log 12 in FIG. 1. The controller may also store such information locally at the DSD in a zone realms log, such as zone realms log 20 in FIG. 1.

In block 504, the controller receives a SATA zone activate command from a host to activate one or more logical zones in a logical zone domain. In some cases, all of the logical zone domains may initially be activated for enabling reading and writing data in the logical zone domains. However, in cases where there are overlapping logical zone domains for one or more physical realms, a SATA zone activate command can specify a range of logical addresses, logical zones, or a logical zone domain to be activated. As a result, the corresponding data access methodology or methodologies are used to read or write data in the physical realm or realms associated with the activated logical zones in the corresponding logical zone domain. In other cases, none of the logical zone domains may initially be activated unless activated by a host. For example, a host may selectively activate particular actuators as needed by sending a zone activate command for the logical zone domain or domains corresponding to the actuators to activate.

In response to the SATA zone activate command received in block 504, the controller in block 506 enables reading and writing of data in the activated one or more logical zones. The controller may also update a zone realms log to indicate which logical zones or logical zone domains are activated. The activation of the logical zones may result from, for example, the need for additional storage capacity or as part of an initialization or configuration process of the DSD. In other examples, logical zones may be activated in response to a host tuning the DSD in the field to meet particular thresholds or design specifications, such as for storage capacity, I/O performance, reliability, or life expectancy of DSD components. A host may set different data access methodologies by activating particular logical zone domains or change a current data access methodology for associated physical realms based on actual workloads in the field.

In block 508, the controller deactivates any logical zones that overlap with the activated logical zones. The controller can determine if any logical zones need to be deactivated by referencing a zone realms log, such as zone realms log 20 in FIG. 1. In some cases, no logical zone may need to be deactivated. For example, in a case where there are no overlapping logical zones, such as where a single logical zone domain is used for all of the physical realms accessed by a given actuator, the activation of logical zones in the logical zone domain would not require deactivating other logical zones.

In block 510, data is accessed in the activated one or more logical zones using the actuator corresponding to the logical zone domain including the activated one or more logical zones. The accessing of data in the logical zone or zones may occur shortly after their activation or may occur at a later point. As discussed in more detail below with respect to the read or write process of FIG. 6, the accessing of data may be in response to a SATA read or write command received from a host. In other cases, the access of data may be in response to an internal maintenance activity performed by the DSD, such as the rewriting of data for garbage collection of SMR logical zones or the refreshing of such data to reduce the likelihood of errors due to ATI or wide area track erasure.

Figure 6:
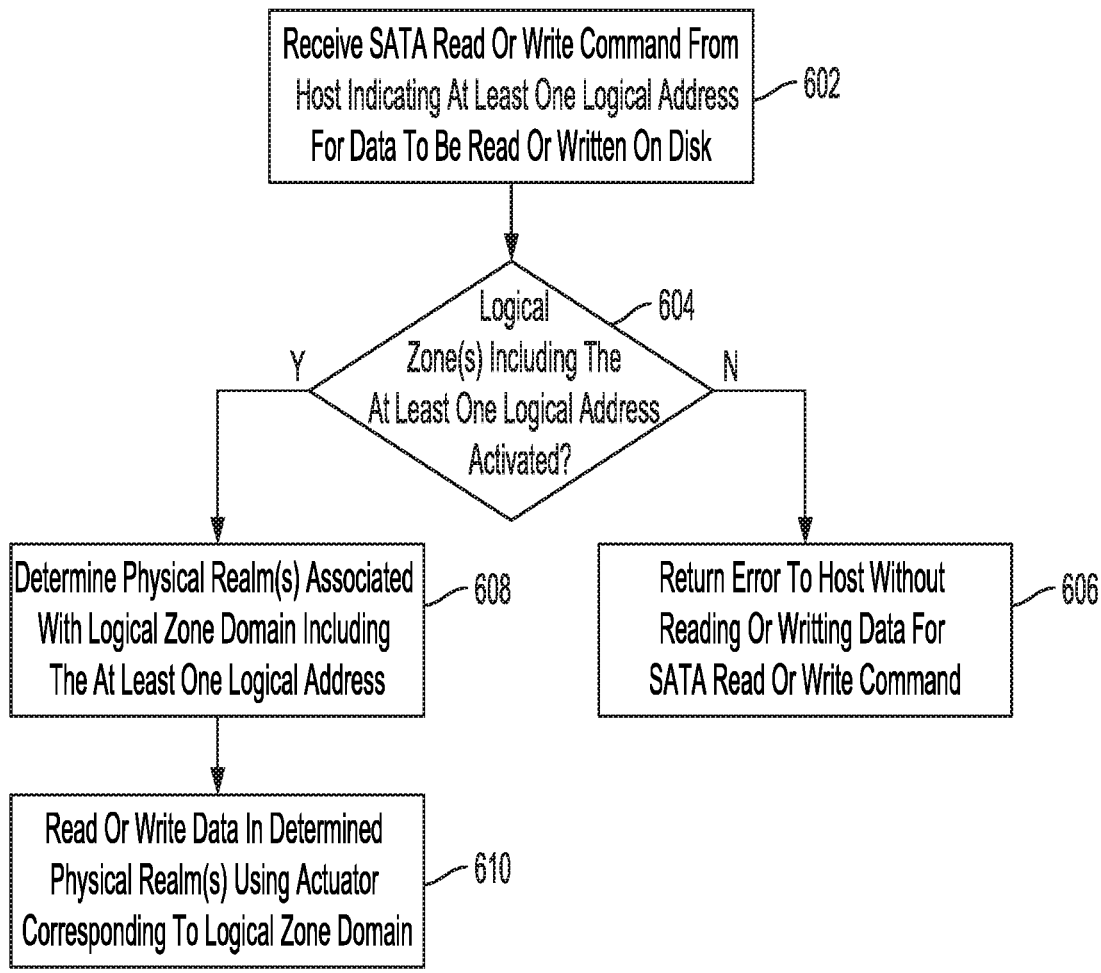
FIG. 6 is a flowchart for a read or write process for a DSD including a plurality of actuators according to an embodiment.

FIG. 6 is a flowchart for a read or write process for a DSD including a plurality of actuators according to an embodiment. The process of FIG. 6 can be performed, for example, by controller 120 of DSD 106 in FIG. 1 executing firmware 18. In some implementations, the process of FIG. 6 can be performed as a sub-process or part of block 510 in FIG. 5 to access data in an activated logical zone or zones.

In block 602, the controller receives a SATA read or write command from a host indicating at least one logical address (e.g., at least one LBA) for data to be read or written on a disk, such as in a physical realm of disk 150 in FIG. 1. As discussed above, the use of a mapping between logical zone domains and physical realms can allow a SATA interface to be used between a host and a DSD including multiple actuators.

In block 604, it is determined whether the logical zone or zones including the at least one logical address for the SATA read or write command have been activated. As discussed above with reference to FIG. 5, the activation of a logical zone enables or allows for the reading and writing of data in the logical zone. In some implementations, the DSD may be preconfigured at the factory to have activated zones so that it is not necessary for a host in the field to activate such zones by sending a SATA zone activate command.

If it is determined in block 604 that the logical zone or zones have not been activated, the controller in block 606 returns an error to the host without reading or writing data for the SATA read or write command. The error can include, for example, a code or message for a DSD driver executed by the host (e.g., DSD driver 10 in FIG. 1) indicating that the logical zone or zones for the at least one logical address in the command have not been activated.

If it is determined in block 604 that the logical zone or zones have been activated, the controller in block 608 determines the physical realm or realms associated with a logical zone domain including the at least one logical address for the command. In some implementations, the controller may reference a zone realms log, such as zone realms log 20 in FIG. 1, to determine physical addresses (e.g., PBAs) for the associated physical realm or realms that map to the at least one logical address.

In block 610, the controller reads or writes data in the determined physical realm or realms using the actuator corresponding to the activated logical zone domain that includes the at least one logical address. As discussed above, associating physical realms with logical zone domains can allow for a SATA interface between a host and a DSD including multiple actuators.

Figure 7:
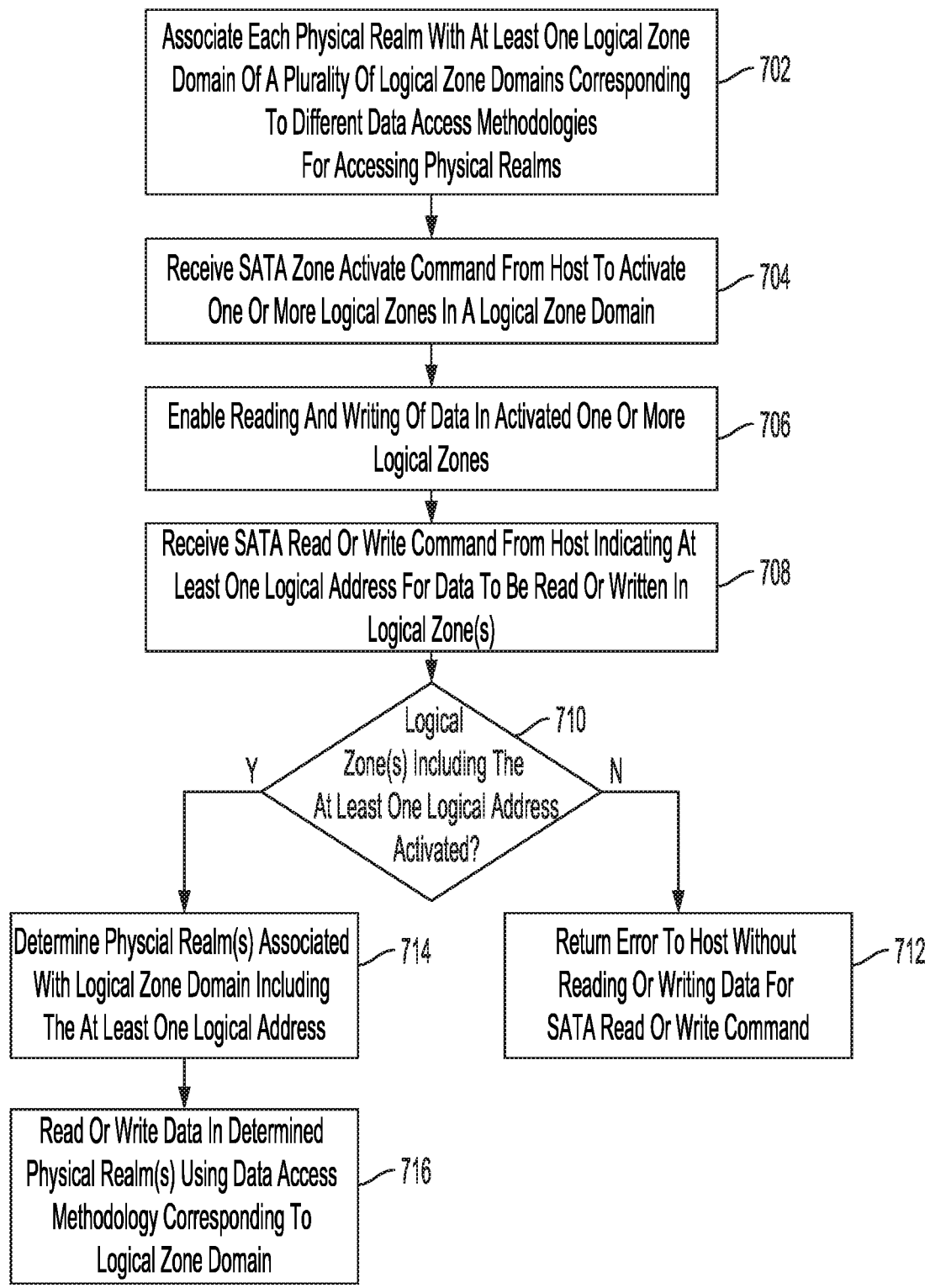
FIG. 7 is a flowchart for a zone activate and data access process for a DSD including different data access methodologies according to an embodiment.

FIG. 7 is a flowchart for a zone activate and data access process for a DSD including different data access methodologies according to an embodiment. The process of FIG. 7 can be performed, for example, by controller 120 in FIG. 1 or 4 executing firmware 18. As compared to the processes of FIGS. 5 and 6 discussed above, the zone activate and data access process of FIG. 7 can be performed by a DSD that may include only a single actuator or that may not include any actuators, such as in an SSD. As with the processes of FIGS. 5 and 6 discussed above, the zone activate and data access process of FIG. 7 uses a SATA zone activate command to activate one or more logical zones and uses a SATA read or write command to read or write data in different physical realms.

In block 702, the controller associates each physical realm of a plurality of physical realms with at least one logical zone domain corresponding to different data access methodologies for accessing data in the physical realm or realms associated with the at least one logical zone domain. Block 702 may be performed as part of an initial start-up or initialization process of the DSD either in the field or at the factory.

In some implementations, each logical zone domain may correspond to a different data access methodology or a different combination of data access methodologies. For example, a first logical zone domain may correspond to data access methodologies A and B, a second logical zone domain may correspond to data access methodologies A and C, and a third logical zone domain may correspond to data access methodologies B and C. In such an example, each of the different logical zone domains correspond to a different combination of data access methodologies.

In other implementations, some of the logical zone domains may correspond to the same data access methodology or the same combination of data access methodologies. With reference to the example provided above, a fourth logical zone domain may be added to the plurality of logical zone domains that corresponds to the same data access methodologies of another logical zone domain, such as data access methodologies A and B. However, the additional logical zone domain may have a different range of logical addresses than that of the other logical zone domain that uses the same data access methodology or methodologies. The use of different logical addressing ranges may be, for example, to differentiate among different types of data, or among data used for different purposes by the host or the DSD.

As discussed above, the different data access methodologies may include, for example, the use of different actuators, SMR or CMR, different energy levels for energy-assisted recording (e.g., TFC, HAMR, MAMR), different levels of error correction, different sector sizes, different BPI or TPI, different storage media (e.g., disk 150 or solid-state memory 142 in FIG. 1), different storage devices (e.g., storage devices 456 to 462), or SLC or MLC storage in a solid-state memory.

In some implementations, the controller in block 702 may also send an indication to one or more hosts of the association of the physical realms with the various logical zone domains and information about the logical addresses (e.g., LBAs) for the different logical zones in the logical zone domains. Such information may be used by the host in a zone realms log, such as zone realms log 12 in FIGS. 1 and 4. The controller may also store such information locally at the DSD in a zone realms log, such as zone realms log 20 in FIGS. 1 and 4.

In block 704, the controller receives a SATA zone activate command from a host to activate one or more logical zones in a logical zone domain. In some cases, all of the logical zone domains may initially be activated for enabling reading and writing data in the logical zone domains. However, in cases where there are overlapping logical zone domains for one or more physical realms, a SATA zone activate command can specify a range of logical addresses, logical zones, or a logical zone domain to be activated. As a result, the corresponding data access methodology or methodologies are used to read or write data in the physical realm or realms associated with the activated logical zones in the corresponding logical zone domain. In other cases, none of the logical zone domains may initially be activated unless activated by a host. For example, a host may selectively activate particular logical zones or logical zone domains as needed.

In response to the SATA zone activate command received in block 704, the controller in block 706 enables reading and writing of data in the activated one or more logical zones. The controller may also update a zone realms log to indicate which logical zones or logical zone domains are activated. The activation of the logical zones may result from, for example, the need for additional storage capacity or as part of an initialization or configuration process of the DSD. In other examples, logical zones may be activated in response to a need to store data using a different data access methodology than a current data access methodology. In this regard, a host may tune the DSD in the field using SATA zone activation commands to meet particular thresholds or design specifications, such as for storage capacity, I/O performance, reliability, or life expectancy of DSD components.

In some implementations, the controller may also deactivate one or more logical zones that overlap with the activated logical zones. The controller can determine if any logical zones need to be deactivated by referencing a zone realms log, such as zone realms log 20 in FIG. 1 or 4. In some cases, no logical zone may need to be deactivated. For example, in a case where there are no overlapping logical zones or where no logical zones have been previously activated for the associated physical realm or realms, the activation of logical zones in the logical zone domain would not require deactivating other logical zones. In addition, blocks 704 to 706 may be omitted in some implementations where logical zones have been previously activated at the factory and there is not a need for the host to reconfigure the activated zones in the field.

In block 708, the controller receives a SATA read or write command from a host indicating at least one logical address (e.g., at least one LBA) for data to be read or written in one or more logical zones. As discussed above, the use of a mapping between logical zone domains and physical realms can allow a SATA interface to be used between a host and a DSD that uses different data access methodologies corresponding to logical zone domains.

In block 710, it is determined whether the logical zone or zones including the at least one logical address for the SATA read or write command have been activated. As discussed above, the activation of a logical zone enables or allows for the reading and writing of data in the logical zone.

If it is determined in block 710 that the logical zone or zones have not been activated, the controller in block 712 returns an error to the host without reading or writing data for the SATA read or write command. The error can include, for example, a code or message for a DSD driver executed by the host (e.g. DSD driver 10 in FIG. 1 or 4) indicating that the logical zone or zones for the at least one logical address in the command have not been activated.

If it is determined in block 710 that the logical zone or zones have been activated, the controller in block 714 determines the physical realm or realms associated with a logical zone domain including the at least one logical address for the command. In some implementations, the controller may reference a zone realms log, such as zone realms log 20 in FIG. 1 or 4, to determine physical addresses (e.g., PBAs) for the associated physical realm or realms that map to the at least one logical address.

In block 716, the controller reads or writes data in the determined physical realm or realms using the data access methodology or methodologies corresponding to the activated logical zone domain that includes the at least one logical address. As discussed above, associating physical realms with logical zone domains can allow for a SATA interface between a host and a DSD including different data access methodologies.

Figure 8:
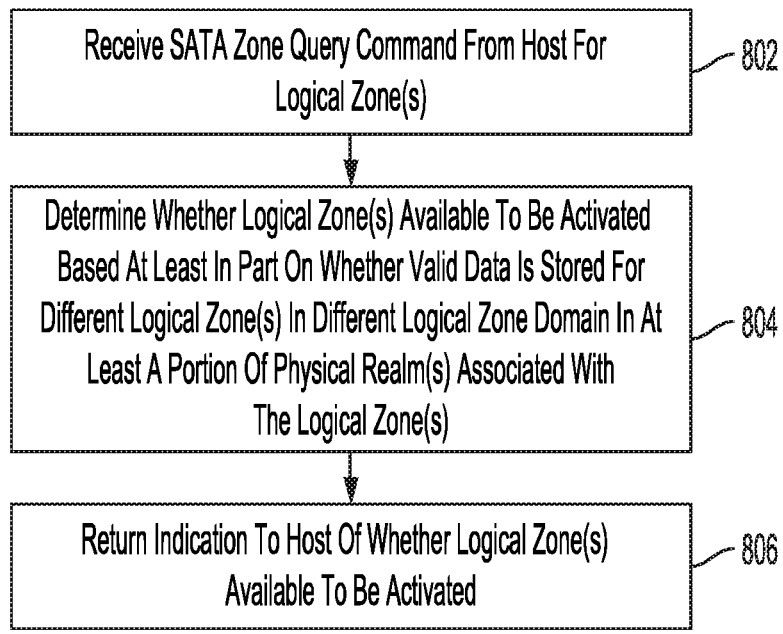
FIG. 8 is a flowchart for a zone query process according to an embodiment.

FIG. 8 is a flowchart for a zone query process according to an embodiment. The process of FIG. 8 can be performed, for example, by controller 120 in FIG. 1 or 4 executing firmware 18. The zone query process of FIG. 8 may be used by a host to determine whether particular logical zones have been activated in a DSD, such as DSD 106 in FIG. 1, DSD 406 in FIG. 4, or other types of DSDs.

In block 802, the controller of the DSD receives a SATA zone query command from a host for one or more logical zones. In block 804, the controller determines whether the one or more logical zones are available to be activated based at least in part on whether valid data is stored for a different logical zone or zones in a different logical zone domain in at least a portion of the physical realm or realms associated with the one or more logical zones indicated by the SATA zone query command. In some implementations, other conditions may also be checked to determine whether the one or more logical zones are available to be activated. For example, other conditions that may be checked are whether the one or more logical zones are part of an existing logical zone domain, or whether use of the logical zone or zones is restricted, such as with logical zone domains that may only be used internally by the DSD or by a different host.

In determining whether valid data is already stored for a different logical zone or zones, the controller may use a zone realms log or other data structure indicating whether valid data is stored at physical addresses or physical realm numbers associated with the logical zone or zones. As will be appreciated by those of ordinary skill in the art, valid data may refer to data that has not been invalidated, not marked for deletion, or is otherwise obsolete. Invalid data may result from, for example, data being rewritten in a different location or data that has been modified and rewritten in a different location.

In block 806, the controller returns an indication of whether the logical zone or zones from the query command are available to be activated. The host may then use this indication to, for example, determine which logical addresses to use for storing data or whether to send a zone activate command as discussed above with reference to FIGS. 5 and 7. The host may use a DSD driver, such as DSD driver 10 in FIG. 1 or 4 to update a data structure, such as a zone realms log.

Figure 9:
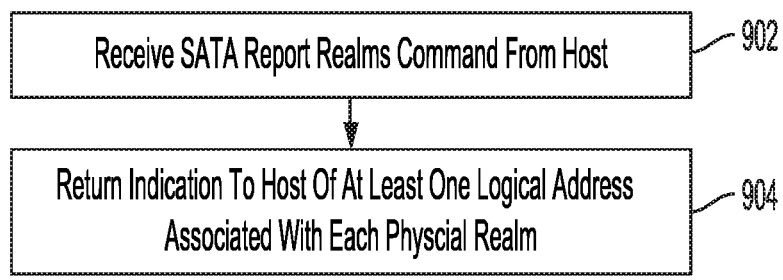
FIG. 9 is a flowchart for a report realms process according to an embodiment.

FIG. 9 is a flowchart for a report realms process according to an embodiment. The process of FIG. 9 can be performed, for example, by controller 120 in FIG. 1 or 4 executing firmware 18. The report realms process of FIG. 9 may be used by a host to determine which realms are available in a DSD, such as DSD 106 in FIG. 1, DSD 406 in FIG. 4, or other types of DSDs.

In block 902, the controller receives a SATA report realms command from a host. The controller may provide portions of a zone realms log or other data structure (e.g., a logical to physical mapping table or other indirection table) to the host. In one implementation, the controller may provide an indication of at least one logical address associated with each physical realm. For example, the controller may provide a starting logical address and an ending logical address for each physical realm for the activated logical zone domains. In other implementations, the controller may provide starting and ending logical addresses for each physical realm for an activated logical zone domain, and also indicate starting and ending logical addresses for each physical realm for inactive logical zone domains.

In block 904, the controller returns an indication to the host of at least one logical address (e.g., LBA) associated with each physical realm. In some cases, this may include starting and ending logical addresses for activated zones or may include a starting logical address and a run length for the physical realm.

Some implementations may include other commands such as a SATA report zone domains command, which can provide a host with logical addresses for all of the logical zone domains for the DSD and an indication of whether the logical zone domain is active or inactive. An example of another SATA reporting command can include a SATA report zones command that provides the host with a list of all logical zones and information about the logical zones such as starting and ending logical addresses, whether the logical zones have been activated, or whether any valid data is stored in the logical zones.

As discussed above, the foregoing association of physical realms with logical zone domains can ordinarily allow for the use of a SATA interface and account for different data access methodologies at the host, such as for DSDs including multiple actuators for accessing data on a disk. The association of physical realms with logical zone domains can further allow for hosts to tune or adjust the relative use of different data access methodologies in the field to achieve particular goals, such as greater storage capacity, improved I/O performance, greater reliability, or a longer usable life of DSD components.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A Data Storage Device (DSD), comprising:
a disk for storing data, the disk including a plurality of physical realms;
a plurality of actuators for reading and writing data on the disk in different physical realms; and
a controller configured to:
associate each physical realm of the plurality of physical realms with at least one logical zone domain corresponding to an actuator of the plurality of actuators that accesses the physical realm, wherein the associating includes:
associating a physical realm of the plurality of physical realms with a first logical zone domain for data to be written with non-overlapping tracks using a first actuator of the plurality of actuators; and
associating the physical realm with a second logical zone domain for data to be written with overlapping tracks using the first actuator;
receive a Serial Advanced Technology Attachment (SATA) read or write command from a host indicating at least one logical address for data to be read or written on the disk;
determine a physical realm associated with a logical zone domain including the at least one logical address indicated by the SATA read or write command; and
read or write data in the determined physical realm using the actuator corresponding to the logical zone domain including the at least one logical address.

2. The DSD of claim 1, wherein the controller is further configured to:
receive a SATA zone activate command from the host to activate one or more logical zones in a logical zone domain to enable reading and writing of data in the one or more logical zones; and
enable reading and writing of data in the activated one or more logical zones in response to the SATA zone activate command.

3. The DSD of claim 2, wherein the controller is further configured to:
determine whether a logical zone including the at least one logical address indicated by the SATA read or write command has been activated; and
in response to determining that the logical zone has been activated, read or write data in the determined physical realm using the actuator corresponding to the logical zone domain including the at least one logical address.

4. The DSD of claim 2, wherein the controller is further configured to deactivate a different logical zone in response to the SATA zone activate command to activate the one or more logical zones, wherein at least a portion of a physical realm is associated with the one or more logical zones in a first logical zone domain and with the deactivated different logical zone in a second logical zone domain.

5. The DSD of claim 2, wherein the controller is further configured to:
receive a SATA zone query command from the host for at least one logical zone; and
in response to the SATA zone query command:
determine whether the at least one logical zone is available to be activated based at least in part on whether valid data is stored for a different logical zone in a different logical zone domain in at least a portion of a physical realm associated with the at least one logical zone; and
return an indication to the host of whether the at least one zone is available to be activated.

6. The DSD of claim 1, wherein the controller is further configured to:
receive a SATA report realms command from the host; and
in response to the SATA report realms command, return an indication to the host of at least one logical address associated with each physical realm of the plurality of physical realms.

7. A method for operating a Data Storage Device (DSD) including a disk for storing data, the disk including a plurality of physical realms and a plurality of actuators for reading and writing data on the disk in different physical realms, the method comprising:
associating each physical realm of the plurality of physical realms with at least one logical zone domain including at least one logical zone, wherein the at least one logical zone domain corresponds to an actuator of the plurality of actuators that accesses the physical realms associated with the at least one logical zone domain;
receiving a Serial Advanced Technology Attachment (SATA) zone activate command from a host to activate one or more logical zones in a first logical zone domain for enabling reading and writing of data in the one or more logical zones;
deactivating a logical zone in response to the SATA zone activate command to activate the one or more logical zones, wherein at least a portion of a physical realm is associated with the one or more logical zones in the first logical zone domain and with the deactivated logical zone in a second logical zone domain;
enabling reading and writing of data in the activated one or more logical zones in response to the SATA zone activate command; and
accessing data in the activated one or more logical zones using the actuator corresponding to the first logical zone domain including the activated one or more logical zones.

8. The method of claim 7, further comprising:
receiving a SATA read or write command from the host to read or write data in a logical zone;
determining whether the logical zone has been activated; and
in response to determining that the logical zone has not been activated, returning an error to the host without reading or writing data for the SATA read or write command in the logical zone.

9. The method of claim 7, further comprising:
receiving a SATA zone query command from the host for a logical zone; and
in response to the SATA zone query command:
determining whether the logical zone is available to be activated based at least in part on whether valid data is stored for a different logical zone in a different logical zone domain in at least a portion of a physical realm associated with the logical zone; and returning an indication to the host of whether the logical zone is available to be activated.

10. The method of claim 7, further comprising:
associating a physical realm of the plurality of physical realms with a first logical zone domain for data to be written with non-overlapping tracks using a first actuator of the plurality of actuators; and
associating the physical realm with a second logical zone domain for data to be written with overlapping tracks using the first actuator.

11. The method of claim 7, further comprising:
receiving a SATA report realms command from the host; and
in response to the SATA report realms command, returning an indication to the host of at least one logical address associated with each physical realm of the plurality of physical realms.

12. A Data Storage Device (DSD), comprising:
at least one storage medium including a solid-state memory for storing data, the at least one storage medium including a plurality of physical realms; and
a controller configured to:
associate each physical realm of the plurality of physical realms with at least one logical zone domain of a plurality of logical zone domains corresponding to different data access methodologies for accessing data in the physical realms, wherein the associating includes:
associating a first physical realm of the plurality of physical realms with a first logical zone domain corresponding to a first portion of the solid-state memory that is to be written as Single Level Cells (SLCs); and
associating a second physical realm of the plurality of physical realms with a second logical zone domain corresponding to a second portion of the solid-state memory that is to be written as Multi-Level Cells (MLCs);
receive a Serial Advanced Technology Attachment (SATA) read or write command from a host indicating at least one logical address for data to be read from or written to the at least one storage medium;
determine a physical realm associated with a logical zone domain including the at least one logical address indicated by the SATA read or write command; and
read or write data in the determined physical realm using the data access methodology corresponding to the logical zone domain including the at least one logical address.

13. The DSD of claim 12, further comprising a plurality of actuators for reading and writing data, wherein the at least one storage medium further includes a disk and each of the plurality of actuators is configured to be used to access data in different physical realms of the disk, and wherein the controller is further configured to:
associate a third physical realm of the plurality of physical realms with a third logical zone domain corresponding to a first actuator of the plurality of actuators that accesses the third physical realm; and
associate a fourth physical realm of the plurality of physical realms with a fourth logical zone domain corresponding to a second actuator of the plurality of actuators that accesses the fourth physical realm.

14. The DSD of claim 13, wherein the third logical zone domain further corresponds to data to be written with non-overlapping tracks using the first actuator, and wherein the controller is further configured to associate the third physical realm with a fifth logical zone domain for data to be written with overlapping tracks using the first actuator.

15. The DSD of claim 12, wherein the at least one storage medium further includes a disk, and wherein the controller is further configured to associate a third physical realm of the plurality of physical realms with a third logical zone domain corresponding to at least a portion of the disk.

16. The DSD of claim 12, wherein the at least one storage medium further includes an array of storage devices, and wherein the controller is further configured to:
associate a third physical realm of the plurality of physical realms with a third logical zone domain corresponding to a first storage device in the array of storage devices; and
associate a fourth physical realm of the plurality of physical realms with a fourth logical zone domain corresponding to a second storage device in the array of storage devices.

17. The DSD of claim 12, wherein the controller is further configured to:
receive a SATA zone activate command from the host to activate one or more logical zones in a logical zone domain for enabling reading and writing of data in the one or more logical zones;
enable reading and writing of data in the activated one or more logical zones in response to the SATA zone activate command; and
access data in the activated one or more logical zones using the data access methodology corresponding to the zone domain including the activated one or more logical zones.

18. A Data Storage Device (DSD), comprising:
at least one storage medium for storing data including a disk, the at least one storage medium including a plurality of physical realms;
a plurality of actuators configured to read and write data in different physical realms of the disk; and
a controller configured to:
associate each physical realm of the plurality of physical realms with at least one logical zone domain of a plurality of logical zone domains corresponding to different data access methodologies for accessing data in the physical realms, wherein the associating includes:
associating a first physical realm of the plurality of physical realms with a first logical zone domain corresponding to a first actuator of the plurality of actuators that accesses the first physical realm; and
associating a second physical realm of the plurality of physical realms with a second logical zone domain corresponding to a second actuator of the plurality of actuators that accesses the second physical realm;
receive a Serial Advanced Technology Attachment (SATA) read or write command from a host indicating at least one logical address for data to be read from or written to the at least one storage medium;
determine a physical realm associated with a logical zone domain including the at least one logical address indicated by the SATA read or write command; and
read or write data in the determined physical realm using the data access methodology corresponding to the logical zone domain including the at least one logical address.

19. A method for operating a Data Storage Device (DSD) including a disk for storing data, the disk including a plurality of physical realms and a plurality of actuators for reading and writing data on the disk in different physical realms, the method comprising:
- associating each physical realm of the plurality of physical realms with at least one logical zone domain including at least one logical zone, wherein the at least one logical zone domain corresponds to an actuator of the plurality of actuators that accesses the physical realms associated with the at least one logical zone domain;
- receiving a Serial Advanced Technology Attachment (SATA) zone activate command from a host to activate one or more logical zones in a logical zone domain for enabling reading and writing of data in the one or more logical zones;
- enabling reading and writing of data in the activated one or more logical zones in response to the SATA zone activate command;
- accessing data in the activated one or more logical zones using the actuator corresponding to the logical zone domain including the activated one or more logical zones;
- receiving a SATA zone query command from the host for a logical zone; and
- in response to the SATA zone query command:
  - determining whether the logical zone is available to be activated based at least in part on whether valid data is stored for a different logical zone in a different logical zone domain in at least a portion of a physical realm associated with the logical zone; and
  - returning an indication to the host of whether the logical zone is available to be activated.

20. A Data Storage Device (DSD), comprising:
- at least one storage medium for storing data including an array of storage devices, the at least one storage medium including a plurality of physical realms; and
- a controller configured to:
  - associate each physical realm of the plurality of physical realms with at least one logical zone domain of a plurality of logical zone domains corresponding to different data access methodologies for accessing data in the physical realms, the associating including:
    - associating a first physical realm of the plurality of physical realms with a first logical zone domain corresponding to a first storage device in the array of storage devices; and
    - associating a second physical realm of the plurality of physical realms with a second logical zone domain corresponding to a second storage device in the array of storage devices;
  - receive a Serial Advanced Technology Attachment (SATA) read or write command from a host indicating at least one logical address for data to be read from or written to the at least one storage medium;
  - determine a physical realm associated with a logical zone domain including the at least one logical address indicated by the SATA read or write command; and
  - read or write data in the determined physical realm using the data access methodology corresponding to the logical zone domain including the at least one logical address.

* * * * *